UNITED STATES PATENT OFFICE

2,223,916

POLYMERIC SULPHONAMIDE, A PROCESS FOR PREPARING IT, AND A FILAMENT MADE THEREFROM

Elmore Louis Martin, Wilmington, Del., assignor to E. I. du Pont de Nemours & Company, Wilmington, Del., a corporation of Delaware No Drawing. Application January 14, 1938,
Serial No. 185,066

17 Claims. (Cl. 260—556)

This invention relates to polyamide-polysulphonamides.

This invention has as an object the preparation of linear polyamide-polysulphonamides. Another object is to prepare suitable intermediates for the preparation of such linear polyamide-polysulphonamides. A further object is to prepare linear polyamide-polysulphonamides which can be utilized in the manufacture of valuable synthetic fibers. Other objects will appear hereinafter.

The polyamide-polysulphonamides of this invention are prepared from certain sulphonamides described more fully below, which are bifunctional in that their terminal groups are amide-forming groups (COOH, $NH_2$, etc.). These bifunctional sulphonamides are reacted with a second bifunctional amide-forming reactant in which the amide-forming groups are complementary to those contained in the sulphonamide. Thus, if the sulphonamide is a dibasic acid or amide-forming derivative thereof, the second bifunctional reactant may be a diamine. Or if the terminal groups of the sulphonamide are amino groups, the second bifunctional reactant may be a dibasic acid or its amide-forming derivative. The polyamide-polysulphonamides thus obtained contain an amide and a sulphonamide group in the recurring structural unit which makes up the polymer. The reaction is carried out under condensation polymerization conditions, and preferably for a time sufficient to yield a fiber-forming product.

The above-mentioned bifunctional sulphonamides may be best identified by the general formula A—R'—Q—R—$SO_2$—NR''—R'—A, in which R and R' represent divalent hydrocarbon radicals having a chain length of at least three atoms, R'' is a hydrogen atom or an univalent hydrocarbon radical, Q is an amide group of the class consisting of —CO—NR'' and —$SO_2$—NR'', and A is an amide-forming grouping. They are prepared by the condensation of a sulphonyl halide of formula X—Z—R—$SO_2$—X, in which Z is —CO— or —$SO_2$—, and X is halogen, preferably chlorine, with a bifunctional compound of the formula B—R'—NHR'', in which B is an amide-forming group (i. e., A) or an univalent radical capable of yielding an amide-forming group on hydrolysis. If B is not an amide-forming group the foregoing condensation must of course be followed by hydrolysis. The preferred bifunctional sulphonamides are those in which Q is —$SO_2$—NR'', i. e., in which the sulphonamide is a disulphonamide. In this case the sulphonyl halide used is a disulphonyl halide of formula X—$SO_2$—R—$SO_2$X. These bifunctional disulphonamides, which are the preferred intermediates in the preparation of polyamide-polysulphonamides, are in themselves new and are quite different from the previously known sulphonamides obtained from disulphonyl halides and monofunctional aromatic bases.

It is to be observed also with regard to the bifunctional sulphonamide intermediates (B—R'—NHR'')

that the alpha- and beta-amino acids, or esters, or nitriles, do not give heat-stable bifunctional sulphonamides and hence are not suitable intermediates for the preparation of high molecular weight polymers. This necessitates the limitation that R' have a chain of at least three atoms. From the standpoint of fiber-forming properties, the best products are obtained when the terminal carbon atoms of R' are aliphatic. Disulphonyl chlorides (X—$O_2S$—R—$SO_2$—X) of the aliphatic series in which the sulphonyl groups are separated by only two carbon atoms liberate sulphur dioxide when treated with amines, alcohol, or water and are therefore not qualified for the preparation of intermediates necessary for this invention. Ortho-disulphonyl chlorides of the aromatic series react with ammonia and primary amines to yield cyclic o-sulphonamides, and these abnormal reactions necessitate the limitation that R have a chain length of at least three atoms.

As has been previously mentioned, the polyamide-polysulphonamides are prepared by reacting under polymerizing conditions substantially chemically equivalent quantities of the above defined bifunctional sulphonamide, preferably a disulphonamide, with a bifunctional amide-forming reactant in which the amide-forming groups are complementary with those in the sulphonamide. Thus, if the bifunctional sulphonamide is a dibasic acid, ester, anhydride, amide, or acid halide, the bifunctional amide forming reactant is a diamine in which each amino nitrogen contains at least one hydrogen atom and is in turn attached to an aliphatic carbon atom. This condensation polymerization step is brought about by heating the reactants under amide-forming conditions, i. e., at a temperature of about 150°–300° C. In its preferred embodiment the reaction is continued until the polymer exhibits fiber-forming properties. The optimum time and temperature are determined in part by the nature of the reactants, in part by the melting point of the resultant polymer, and in part by the size of the batch. The process is preferably carried out at a temperature above the melting point of the polyamide-polysulphonamide. The necessary conditions for the preparation of superpolymers (i. e., fiber-forming polymers) vary according to the particular case but in practice the conversion to a fiber-forming polymer is easily tested by merely touching the surface of the molten polymer with a rod and drawing the rod away. If the fiber-forming stage is reached, a continuous filament of considerable strength and pliability is readily obtained.

The degree of polymerization may also be followed by determining the intrinsic viscosity of a solution of the polymer in m-cresol as described in British Patent 461,237. Polyamide-polysulphonamides having an intrinsic viscosity of approximately 0.4, or greater, are generally of sufficiently high molecular weight to yield continuous filaments when tested by the simple method described above. The heat treatment necessary to obtain products qualified for spinning must be determined for each polymer as inferior products result if the heat treatment is continued for periods of too long or too short duration.

The following examples, in which the quantities of reagents are parts by weight, are illustrative of the methods used in practicing my invention:

EXAMPLE I

*Preparation of the disulphonamide*

To 44.8 parts of ε-aminocapronitrile,

H$_2$N—(CH$_2$)$_5$—CN was added 24.1 parts of trimethylenedisulphonyl chloride, Cl—O$_2$S—(CH$_2$)$_3$—SO$_2$—Cl, M. P. 48–49° C., the temperature being maintained at 80–90° C. The reaction was completed by warming on a steam bath for 15 minutes. The reaction product, trimethylenedisulphonyl-bis-ε-aminocapronitrile,

NC—(CH$_2$)$_5$—NH—O$_2$S—(CH$_2$)$_3$—
SO$_2$—NH—(CH$_2$)$_5$—CN

M. P. 96–98° C., was purified by crystallization from aqueous methanol; yield, 29.6 parts.

The product (dinitrile) was hydrolyzed to the bifunctional disulphonamide (trimethylenedisulphonyl-bis-ε-aminocaproic acid),

HOOC—(CH$_2$)$_5$—NH—O$_2$S—(CH$_2$)$_3$—
SO$_2$—NH—(CH$_2$)$_5$—COOH

M. P. 148–150° C., by refluxing with concentrated hydrochloric acid in the usual manner.

Anal. calculated for C$_{15}$H$_{30}$O$_8$N$_2$S$_2$—N, 6.44; S, 14.73. Found—N, 6.37; S, 15.12.

*Preparation of the polyamide-polysulphonamides*

To a solution of 8.6 parts of the disulphonamide, trimethylenedisulphonyl-bis-ε-aminocaproic acid, in hot alcohol was added 2.4 parts of hexamethylene diamine. The dibasic acid-diamine salt, hexamethylene diammonium trimethylenedisulphonyl-bis-ε-aminocaproate,

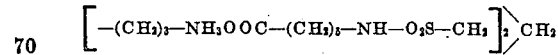

separated on cooling; yield, 10.9 parts.

The above prepared salt was heated in a closed reaction vessel during 1.2 hours at a temperature of 210–230° C. and then under reduced pressure during 4 hours at a temperature of 210–230° C. The hexamethylene trimethylenedisulphonyl-bis-ε-aminocaproamide polymer,

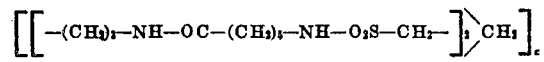

thus formed was a hard, rather tough, opaque solid which melted to a viscous liquid at about 175° C. The polymer (a polyamide-polysulphonamide) could be drawn into long filaments by touching the molten polymer with a rod and then withdrawing the rod. The intrinsic viscosity of the polymer was 0.80. It was insoluble in common solvents under ordinary conditions but was soluble in formic acid and phenol.

*Preparation of filaments*

The above polyamide-polysulphonamide was spun into continuous filaments of fairly uniform diameter by gas pressure extrusion of the molten polymer from a spinneret having an orifice 0.0197" in diameter and maintained at 250° C. by means of a suitable vapor bath. The undrawn filaments had a denier of 4.95 and a tensile strength in grams per denier at break of 2.19. By the action of stress the filaments could be permanently stretched, elongated, or "cold-drawn" as much as 173% with the formation of oriented filaments or fibers.

EXAMPLE II

Following the general procedure as outlined in Example I, hexamethylenedisulphonyl - bis - ε-aminocapronitrile, NC—(CH$_2$)$_5$—NH—O$_2$S—(CH$_2$)$_6$—SO$_2$—NH—(CH$_2$)$_5$—CN, M. P. 110–111° C., was prepared from hexamethylenedisulphonyl chloride, Cl—O$_2$S—(CH$_2$)$_6$—SO$_2$—Cl, M. P. 82–83° C., and ε-aminocapronitrile. On hydrolysis the nitrile yielded hexamethylenedisulphonyl-bis-ε-aminocaproic acid, HOOC—(CH$_2$)$_5$—NH—O$_2$S—(CH$_2$)$_6$—SO$_2$—NH—(CH$_2$)$_5$—COOH, M. P. 162–164° C., which with hexamethylene diamine gave the salt, hexamethylene diammonium hexamethylenedisulphonyl-bis-ε-aminocaproate, [—(CH$_2$)$_3$—NH$_3$—OOC—(CH$_2$)$_5$—NH—O$_2$S—(CH$_2$)$_3$—]$_2$. Condensation polymerization of the dibasic acid-diamine salt at 210–220° C. for 1.1 hour in a closed reaction vessel and then at 210–240° C. under reduced pressure for 1.2 hour yielded hexamethylene hexamethylenedisulphonyl - bis - ε - aminocaproamide polymer [—(CH$_2$)$_3$—NH—OC—(CH$_2$)$_5$—NH—O$_2$S—(CH$_2$)$_3$—]$_x$, M. P. 180–185° C. The intrinsic viscosity of the polymer (a polyamide-polysulphonamide) was 0.32. By touching the molten polymer with a rod and withdrawing the rod, short filaments were obtained. Prolonging the polymerization reaction was found to give a polymer of higher intrinsic viscosity and improved fiber-forming properties.

EXAMPLE III

Following the general procedure as outlined in Examples I and II, m-benzenedisulphonyl-bis-ε-aminocapronitrile, NC—(CH$_2$)$_5$—NH—O$_2$S—C$_6$H$_4$—SO$_2$—NH—(CH$_2$)$_5$—CN, was prepared from m-benzenedisulphonyl chloride and ε-aminocapronitrile. On hydrolysis it gave m-benzenedisulphonyl - bis - ε - aminocaproic acid, HOOC—(CH$_2$)$_5$—NH—O$_2$S—C$_6$H$_4$—SO$_2$—NH—(CH$_2$)$_5$—COOH, which with hexamethylene diamine gave hexamethylene diammonium m-benzenedisulphonyl-bis-ε-aminocaproate,

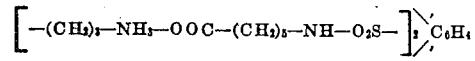

Condensation polymerization of the diammonium salt at 200-220° C. in a closed reaction vessel for 1.5 hour and then at 210-230° C. under reduced pressure for 1.7 hour gave hexamethylene m-benzenedisulphonyl-bis-ε-aminocaproamide polymer,

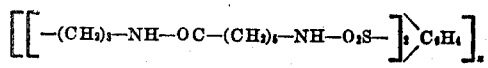

M. P. 185° C. The intrinsic viscosity of this polyamide-polysulphonamide was 0.73. It was readily spun into continuous filaments capable of being "cold-drawn."

EXAMPLE IV

The diurethane, H₅C₂OOC—NH—(CH₂)₆—NH—O₂S—(CH₂)₄—SO₂—NH—(CH₂)₆—NH—COOC₂H₅, was prepared by reacting 80 parts of ethyl 6-aminohexyl urethane hydrochloride (H₅C₂OOC—NH—(CH₂)₆—NH₂·HCl) with 38.5 parts of tetramethylene disulphonyl chloride in an alkaline medium. After crystallization from acetic acid the diurethane (55 parts) melted at 187-188° C. A mixture of 20 parts of the diurethane and 50 parts of concentrated hydrochloric acid was then refluxed for 2 hours, followed by evaporation to dryness under reduced pressure on the steam bath. This converted the diurethane into the corresponding dihydrochloride. On treatment with alkali the dihydrochloride was changed into tetramethylene disulphonyl-bis-6-aminohexyl diamine, H₂N—(CH₂)₆—NH—O₂S—(CH₂)₄—SO₂—NH—(CH₂)₆—NH₂. The diamine (a disulphonamide containing terminal amino groups) was separated in a yield of 10 parts. The product melted at 119° C. It was converted into the diamine-dibasic acid salt, [—(CH₂)₂—COO—NH₃—(CH₂)₆—NH—O₂S—(CH₂)₂—]₂, by reaction with adipic acid in ethanol solution. The polyamide-polysulphonamide, [—CH₂)₂—CO—NH—(CH₂)₆—NH—O₂S—(CH₂)₂—]ₓ, was obtained from this salt by heating it in a closed reaction vessel at 200-230° C. for 3 hours and then under reduced pressure during 2 hours at 255° C. The resultant polymer was a hard, tough, opaque solid which melted to a viscous liquid at about 226° C. The polymer had an intrinsic viscosity of 0.82 and could be spun into long filaments capable of undergoing "cold-drawing." The polymer was soluble in formic acid, phenol, and concentrated hydrochloric acid, but was insoluble in the more common solvents.

As additional examples of bifunctional compounds of formula B—R'—NHR" that may be reacted with the disulphonyl halides for preparing the bifunctional sulphonamides may be mentioned:

HOOC—(CH₂)₃—NH₂

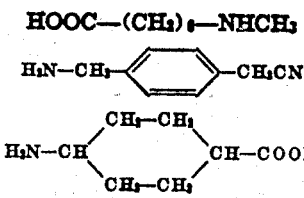

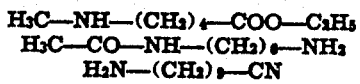

H₃C—NH—(CH₂)₄—COO—C₂H₅
H₃C—CO—NH—(CH₂)₆—NH₂
H₂N—(CH₂)₅—CN and

H₂N—(CH₂)₅—CO—NH₂

In place of the bifunctional disulphonamides (A—R'—NR"—SO₂—R—SO₂—NR"—R'—A)

used in the preparation of the polyamide-polysulphonamides of the above examples, I may use bifunctional sulphonamides of the general formula A—R'—Q—R—SO₂—NR"—R'—A, in which Q, as already indicated, may be either —CO—NR"— or —SO₂NR"—. As additional examples of such bifunctional sulphonamides there may be mentioned:

H₃C—OOC—(CH₂)₄—NCH₃—O₂S—
(CH₂)₄—SO₂—NCH₃—(CH₂)₄—COO—CH₃
H₅C₂OOC—(CH₂)₅—NH—O₂S—(CH₂)₂—
CHCH₃—(CH₂)₃—SO₂—NH—
(CH₂)₆—COOC₂H₅

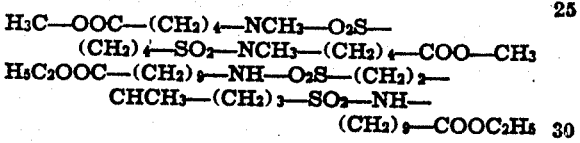

HOOC—(CH₂)₂—CHCH₃—CH₂—NH—
O₂S—(CH₂)₁₀—SO₂—NH—
CH₂—CHCH₃—(CH₂)₂COOH

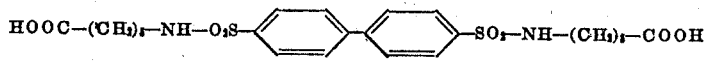

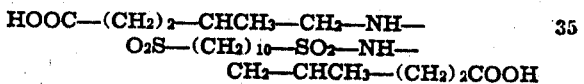

H₂N—(CH₂)₆—NH—O₂S—(CH₂)₄—
SO₂—NH—(CH₂)₆—NH₂
H₃C—NH—(CH₂)₅—NH—O₂S—(CH₂)₃—
SO₂—NH—(CH₂)₅—NH—CH₃
H₂N—(CH₂)₁₀—NCH₃—O₂S—(CH₂)₅—
SO₂—NCH₃—(CH₂)₁₀—NH₂
H₂N—CHCH₃—(CH₂)₈—CHCH₃—NH—
O₂S—(CH₂)₅—SO₂—NH—
CHCH₃—(CH₂)₈—CHCH₃—NH₂
HOOC—(CH₂)₅—NH—CO—(CH₂)₃—
SO₂—NH—(CH₂)₅—COOH

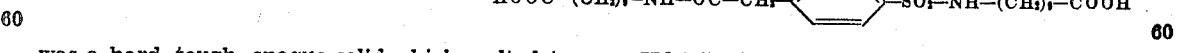

HOOC—(CH₂)₅—SO₂—NH—(CH₂)₆—NH₂
HOOC—(CH₂)₅—SO₂—NH—(CH₂)₅—COOH
and

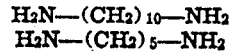

Various diamines may be used as the complementary amide-forming reactants in obtaining the polyamide-polysulphonamides from the bifunctional sulphonamides when the terminal groups of these latter compounds comprise carboxyl groups. Examples of these diamines are:

H₂N—(CH₂)₁₀—NH₂
H₂N—(CH₂)₅—NH₂

H$_2$N—(CH$_2$)$_2$—CHCH$_3$—(CH$_2$)$_3$—NH$_2$
H$_3$C—NH—(CH$_2$)$_6$—NH—CH$_3$

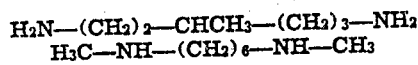

H$_2$N—CHCH$_3$—(CH$_2$)$_8$—CHCH$_3$—NH$_2$
NH$_2$CH$_2$CH$_2$CH$_2$OCH$_2$CH$_2$CH$_2$NH$_2$ and

NH$_2$CH$_2$C$_6$H$_4$CH$_2$NH$_2$

When the bifunctional sulphonamides contain terminal amino groups, the complementary amide-forming reactant is a dibasic acid or an amide-forming derivative thereof as, for instance, HOOC—(CH$_2$)$_8$—COOH
H$_5$C$_2$—OOC—(CH$_2$)$_2$—CHCH$_3$—
CH$_2$—COO—C$_2$H$_5$
C$_6$H$_5$—OOC—(CH$_2$)$_7$—COO—C$_6$H$_5$
H$_2$N—OC—(CH$_2$)$_4$—CO—NH$_2$

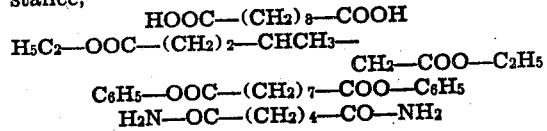

H$_3$C—OOC—(CH$_2$)$_3$—CHCH$_3$—
(CH$_2$)$_3$—COO—CH$_3$ and

HOOC—CHCH$_3$—(CH$_2$)$_2$—CHCH$_3$—COOH

In the preparation of polyamide-polysulphonamides of this invention the bifunctional sulphonamide and the complementary amide-forming reactant are heated to amide-forming temperatures, the preferred temperature being between 180 and 250° C. The reaction may be carried out in a closed or open vessel in the presence or absence of a diluent (solvent or non-solvent). In the last stage of the reaction the conditions should be such that the by-product of the reaction, e. g., water, can escape if a fiber-forming polymer is desired. Suitable solvents in which to carry out the reaction are phenol, m-cresol, and o-hydroxydiphenyl. Preferably the reaction should be carried out in the absence of oxygen. This can be done by operating in the presence of an inert gas such as nitrogen or carbon dioxide, or in a vacuum. The polymer may be freed of solvent, if present, by direct distillation of the solvent under reduced pressure, or the polymer may be precipitated by the addition of a diluent in which the polymer is insoluble such as ethyl acetate, acetone, alcohol, or dilute alkali. Final traces of the phenolic solvent may be removed from the precipitated polymer by extraction with hot alcohol, acetone or ethyl acetate, or by heating the polymer under reduced pressure, preferably at a temperature slightly above the melting point of the polymer.

The extent of the condensation polymerization may be controlled by using a slight excess of either bifunctional amide-forming reactant or by the addition of a small amount of a monofunctional amide-forming reactant, e. g., acetic acid, or by a combination of both methods. Polymers obtained in this way are referred to as "viscosity stable polymers." Stabilization of the polymer is especially desirable if the polymer is to be spun into continuous filaments from melt as an increase in molecular weight during the spinning process increases the melt viscosity and makes the manufacture of filaments of uniform denier more difficult. A catalyst, e. g., a metal or metal salt, may be used in the preparation of the polymer but in general no added catalysts are needed. Examples of such materials are inorganic materials of alkaline reaction such as oxides and carbonates, and acidic materials such as halogen salts of polyvalent metals.

Continuous filaments may be obtained from the polyamide-polysulphonamides in a number of ways. The polymer may be dissolved in a suitable solvent and the solution extruded through orifices into a coagulating bath, the resulting filaments being continuously collected on a suitable revolving bobbin. The extruded filaments may also be passed through a heated chamber where the solvent is removed by evaporation. As indicated in the examples, filaments can also be prepared by melt spinning. The diameter of the filaments may be regulated by controlling the temperature of the molten mass, the pressure used to extrude the polymer, the rate of reeling and the size of the orifice. In spinning from melt, it is desirable to exclude oxygen from the mass of molten polymer.

Although the preferred procedure for preparing the polyamide-polysulphonamides comprises heating the reactants until they exhibit fiber-forming properties, it is within the scope of the invention to discontinue heating before this stage is reached. The low molecular weight or non-fiber-forming polymers are useful for certain applications, e. g., coating and molding compositions.

The properties of the linear polyamide-polysulphonamides adapt them to a variety of useful purposes. The superpolymers have the capacity of being "cold-drawn," that is elongated under application of stress in the solid state, into strong oriented fibers which are suitable to be used as artificial silk, artificial hair, bristles, threads, filaments, ribbon and films. The filaments can be formed into yarns and fabrics. In this use the filaments and yarns can be admixed with other types of filaments or yarns to give mixed yarns and fabrics. The compounds may be used in the fabrication of molded articles or sheeted materials for use in the manufacture of safety glass. They may also be used as coating compositions. In these or other uses they may be used alone or in admixture with resins, cellulose derivatives, plasticizers, pigments, dyes, oils, anti-oxidants, etc.

The invention provides a process for the preparation of linear fiber-forming polymers containing both sulphonamide and carboxylic amide linkages. The products, polyamide-polysulphonamides, are relatively high-melting solids insoluble in most inorganic solvents but soluble in hot phenol and acids such as formic, sulphuric and hydrochloric. The relatively high melting point, insolubility, and chemical inertness of these products render them particularly suitable for the production of fibers, interlayers for safety-glass, and as ingredients for molding compositions.

As many apparently widely different embodiments of this invention may be made without departing from the spirit and scope thereof, it is to be understood that I do not limit myself to the specific embodiments thereof except as defined in the appended claims.

I claim:

1. A process for producing polyamide-polysulphonamides which comprises reacting a sulphonyl halide of the formula X—Z—R—SO$_2$X, in which X is halogen, Z is an acidic group selected from the class consisting of —CO— and —SO$_2$—, and R is a divalent hydrocarbon radical free from non-benzenoid unsaturation and having a chain of at least three carbon atoms, with a bifunctional compound of the formula B—R'—NHR",
in which B is a group selected from the class consisting of amide-forming groups and univalent
radicals capable of yielding an amide-forming
group upon hydrolysis, R' is a divalent hydrocarbon radical free from non-benzenoid unsaturation and having a chain of at least three carbon atoms, and R" is a constituent selected from
the class consisting of hydrogen and alkyl radicals, and then reacting the resultant bifunctional
sulphonamide under condensation polymerization conditions with a bifunctional amide-forming
reactant in which the amide-forming groups are
complementary to those in the bifunctional sulphonamide.

2. A process for producing polyamide-polysulphonamides which comprises reacting a disulphonyl halide of the formula

in which X is halogen and R is a divalent hydrocarbon radical free from non-benzenoid unsaturation and having a chain length of at least
three carbon atoms, with a bifunctional compound of the formula B—R'—NHR", in which
B is a group selected from the class consisting
of amide-forming groups and univalent radicals
capable of yielding an amide-forming group upon
hydrolysis, R' is a divalent hydrocarbon radical
free from non-benzenoid unsaturation and having a chain of at least three carbon atoms, and
R" is a constituent selected from the class consisting of hydrogen and alkyl radicals, and then
reacting the resultant bifunctional disulphonamide under condensation polymerization conditions with a bifunctional amide-forming reactant
in which the amide-forming groups are complementary to those in the bifunctional disulphonamide.

3. In a process for producing bifunctional disulphonamides, the step comprising reacting a disulphonyl halide of the formula

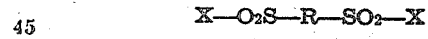

with a bifunctional compound of the formula
B—R'—NHR", in which X, R, B, R', and R" are
defined as in claim 2.

4. A process for producing polyamide-polysulphonamides which comprises reacting a bifunctional sulphonamide of the formula

in which A is an amide-forming group, R and R'
are divalent hydrocarbon radicals free from non-benzenoid unsaturation and having a chain length
of at least three atoms, R" is a constituent selected from the class consisting of hydrogen and
alkyl radicals, and Q is an amide group of the
class consisting of —CO—NR" and —SO₂—NR",
with a bifunctional amide-forming reactant in
which the amide-forming groups are complementary to those contained in said sulphonamide.

5. A process for producing polyamide-polysulphonamides which comprises reacting a bifunctional disulphonamide of the formula

in which A is an amide-forming group, R and R'
are divalent hydrocarbon radicals free from non-benzenoid unsaturation and having a chain
length of at least three atoms, and R" is
a constituent selected from the class consisting
of hydrogen and alkyl radicals, with a bifunctional amide-forming reactant in which the
amide-forming groups are complementary to
those contained in said disulphonamide.

6. The process set forth in claim 4 in which
the reaction is conducted at a temperature of
from about 150 to 300° C.

7. The process set forth in claim 5 in which
the reaction is conducted at a temperature of
from about 150 to 300° C.

8. The process set forth in claim 4 in which
the terminal groups of R' are saturated aliphatic
groups and in which the reaction is conducted
at a temperature of from about 150 to 300° C.
and is continued until the polymer obtained is
capable of being formed into useful fibers.

9. The process set forth in claim 5 in which
the terminal groups of R' are saturated aliphatic
groups and in which the reaction is conducted
at a temperature of from about 150 to 300° C.
and is continued until the polymer obtained is
capable of being formed into useful fibers.

10. A bifunctional disulphonamide comprising
the reaction product of a disulphonyl halide of
the formula X—O₂S—R—SO₂—X and a bifunctional compound of the formula B—R'—NHR",
in which B is a carboxyl group and X, R, R',
and R" are defined as in claim 2.

11. A polyamide-polysulphonamide comprising
the reaction product of a bifunctional sulphonamide and a bifunctional amide-forming reactant,
said sulphonamide having the formula

in which A is an amide-forming group, R and R'
are divalent hydrocarbon radicals free from non-benzenoid unsaturation and having a chain
length of at least three atoms, R" is a constituent
selected from the class consisting of hydrogen and
alkyl radicals, and Q is an amide group of the
class consisting of —CO—NR" and —SO₂—NR",
and said bifunctional amide-forming reactant
having its amide-forming groups complementary
to those contained in said sulphonamide.

12. A polyamide-polysulphonamide comprising
the reaction product of a bifunctional disulphonamide and a bifunctional amide-forming reactant, said disulphonamide having the formula
A—R'—NR"—SO₂—R—SO₂—NR"—R'—A, in
which A is an amide-forming group, R and R'
are divalent hydrocarbon radicals free from non-benzenoid unsaturation and having a chain
length of at least three atoms, and R" is a constituent selected from the class consisting of hydrogen and alkyl radicals, and said bifunctional
amide-forming reactant having its amide-forming groups complementary to those contained in
said disulphonamide.

13. The polyamide-polysulphonamide set forth
in claim 11 which has an intrinsic viscosity of at
least 0.4.

14. The polyamide-polysulphonamide set forth
in claim 12 which has an intrinsic viscosity of
at least 0.4.

15. A polyamide-polysulphonamide containing
the structural unit

where R', Q, R, and R" are defined as in claim
11.

16. A polyamide-polysulphonamide capable of being formed into useful fibers, said polyamide-polysulphonamide containing the structural unit —R'—Q—R—SO$_2$—NR''—R'—, in which R', Q, R, and R'' are defined as in claim 11.

17. A filament comprising essentially a polyamide-polysulphonamide, said polyamide-polysulphonamide containing the structural unit —R'—Q—R—SO$_2$—NR''—R'—, in which R', Q, R, and R'' are defined as in claim 11.

ELMORE LOUIS MARTIN.